United States Patent [19]

Harcourt et al.

[11] 4,279,603
[45] Jul. 21, 1981

[54] FLEXIBLE PADDLE WHEEL STRUCTURE

[75] Inventors: Colin H. Harcourt; D. Roy Barker, both of Calgary, Canada

[73] Assignee: Hoverlift Systems Ltd., Calgary, Canada

[21] Appl. No.: 86,307

[22] Filed: Oct. 19, 1979

[51] Int. Cl.³ .............................................. B63H 1/04
[52] U.S. Cl. ..................................... 440/90; 152/220; 180/15; 301/52; 305/19; 403/262; 403/337; 416/86
[58] Field of Search .................... 440/90, 91; 114/270; 416/84, 86, 197 R, 240; 180/10, 15, 16; 301/42, 52; 152/217, 220, 239; 305/19; 403/258, 260, 262, 337; 272/1 B; 172/519, 540, 552

[56] References Cited

U.S. PATENT DOCUMENTS

| 101,004 | 3/1870 | Goodwin | 440/91 X |
|---|---|---|---|
| 2,926,717 | 3/1960 | Dunlap | 152/239 X |
| 2,947,337 | 8/1960 | Ambeau | 152/220 |
| 3,547,177 | 12/1970 | Valley | 152/220 |
| 3,664,290 | 5/1972 | Finn | 272/1 B X |
| 3,696,852 | 10/1972 | Oulmaw | 152/220 |
| 3,898,949 | 8/1975 | Kearsey | 114/270 |
| 3,968,766 | 7/1976 | House | 114/270 |

Primary Examiner—Robert J. Spar
Assistant Examiner—Fred A. Silverberg
Attorney, Agent, or Firm—Sidney T. Jelly

[57] ABSTRACT

A flexible paddle wheel structure comprises a pair of axially spaced wheels, having flexible rims, such as, for example, pneumatic tires, with pairs of radially spaced, transverse, flexible members extending between, and attached to, the rims. A flexible membrane extends between the transverse members in each pair to form a flexible paddle. The wheels can tilt relative to each other and the whole structure can be arranged to be lifted and lowered.

14 Claims, 6 Drawing Figures

FLEXIBLE PADDLE WHEEL STRUCTURE

This invention relates to a flexible paddle wheel structure for and in particular to a paddle wheel construction in which flexible paddles are supported between two wheel-like members having flexible rims.

Paddle wheels have been used for propulsion, generally of rigid paddles surrounding an axle. A major problem of such paddles is damage when meeting an obstacle. Spring loaded paddles have been proposed, the paddles being displaced against a spring load when meeting an obstacle. However, such spring loading must always be strong enough to prevent displacement of the paddles under normal propulsion loading. It is very difficult to provide a structure which is stiff enough to avoid displacement during propulsion and yet displace readily when meeting an obstacle.

The present invention provides a paddle wheel structure comprising two axially spaced wheel-like members having flexible rims, with a plurality of pairs of transverse flexible members extending between the rims, the transverse members of a pair spaced radially and a flexible membrane extending between each pair of transverse members, to form a plurality of radial paddles extending between the wheel-like members. The transverse members can be attached to attachment members extending around, and/or over the ring.

In its simplest form the invention can comprise an axially spaced pair of wheels on a common axle and having rubber tires thereon, and circumferentially extending chains, similar to snow-chains on each tire, and radially spaced pairs of cables extending between the chains on the wheels. A tube of rubberized fabric, or similar material, extends over each pair of cables to form radial paddles. The cables can flex of themselves and also the flexibility of the tires permits further flexing of the cables, and thus also the covering fabric, to ride over obstacles.

The wheel-like members are connected together, and are attached to some form of drive mechanism. Preferably the mounting of the wheel members is such that tilting of the axis of the axle connecting the wheels can occur to permit lifting of one wheel relative to the other.

The invention is particularly applicable to the propulsion of vehicles, and particularly air cushion vehicles, over water on which there may be broken ice or other floating obstacles.

The invention will be readily understood by the following description of certain embodiments, by way of example, in conjunction with the accompanying drawings, in which.

Figure 1:
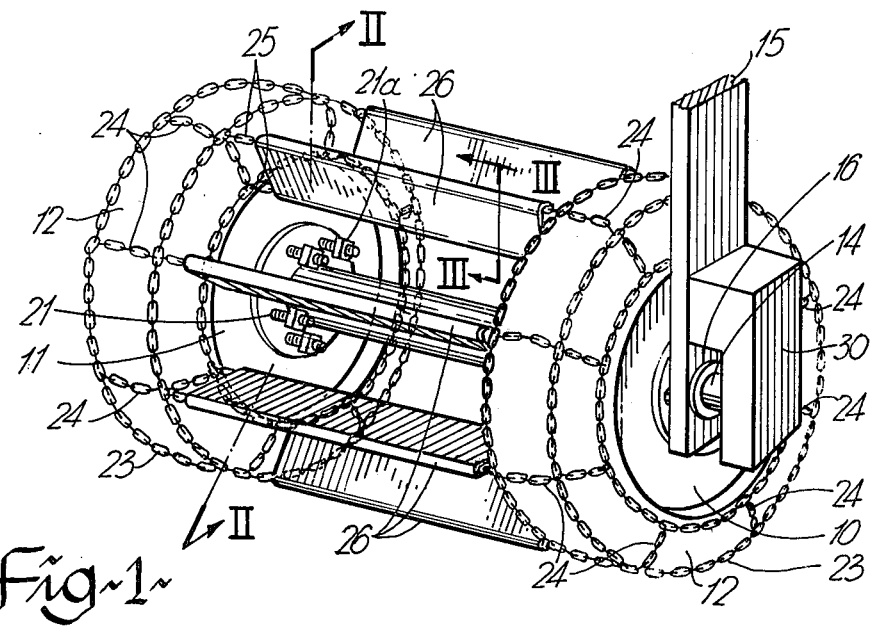
FIG. 1 is a perspective view of an arrangement having two wheels with pneumatic tires and chains.
Figure 2:
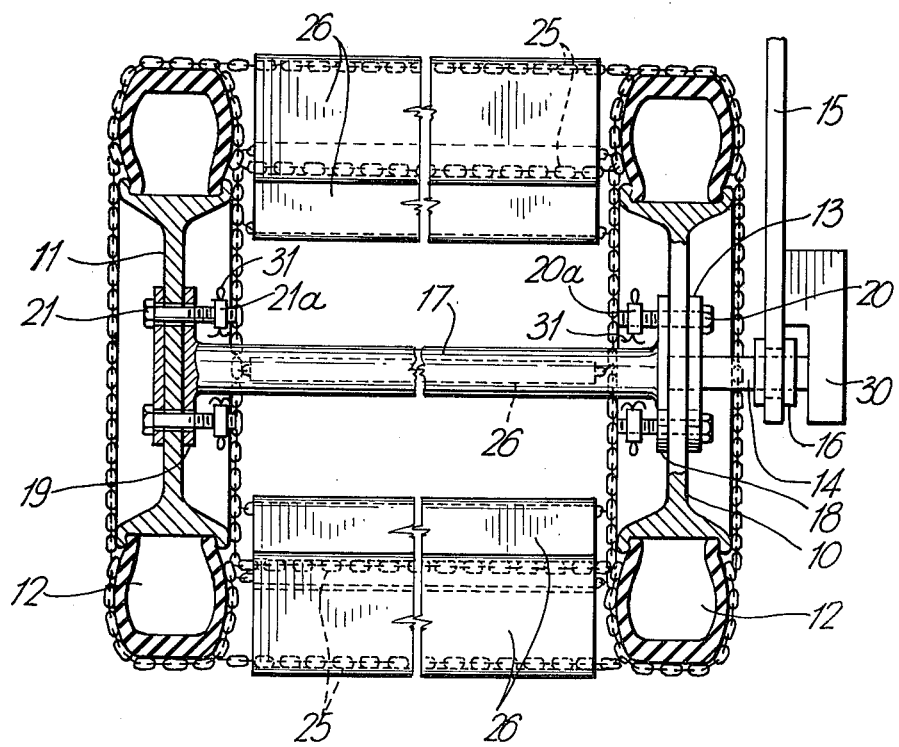
FIG. 2 is a cross-section on the line II—II of FIG. 1.

As illustrated in FIGS. 1 and 2, a paddle wheel structure comprises two wheels 10 and 11, having pneumatic tires 12 thereon. What can be termed the inboard wheel 10 is attached via a flange 13 to a stub shaft 19 which in turn is rotatably supported in a support member 15, via a bearing 16. The outboard wheel 11 is connected to the inboard wheel 10 via a shaft 17 having flanges 18 and 19 at the ends, flange 18 connected to the inboard wheel 10 and flange 19 connected to the outboard wheel 11, as by bolts and nuts 20 and 20a and 21 and 21a.

Extending circumferentially around each tire 12 are chain assemblies. Each chain assembly comprises a circumferential chain 23 on each side of the tire and radially extending chains 24 connecting the circumferential chains 23. The radially extending chains 24 are spaced around the tire. Pairs of cables 25 extending transversely between a radial chain 24 on one wheel and an opposed radial chain 24 on the other wheel. The cables 25 are attached at each end to spaced links of the radially extending chains 24.

Figure 3:
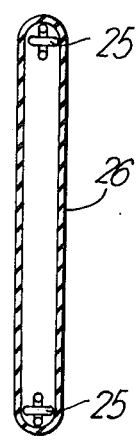
FIG. 3 is a cross-section on the line III—III of FIG. 1.

The pairs of cables 25 carry paddles 26 of flexible material. A convenient form of paddle is a tube of flexible material with the cables 25 positioned inside the tube, as illustrated in FIG. 3. A suitable material is rubber covered or impregnated canvas, or other forms of impregnated material.

The wheels and axle assembly, 10, 11, 17 and 18 are rotatable, for example by an hydraulic motor 30 mounted on the support member 15. In the embodiment illustrated in FIGS. 1 and 2, outboard wheel 11 is attached to the shaft 17 by nuts and bolts 21/21a such that the wheel 11 can deflect relative to the shaft 17. This can be obtained by using long bolts and fixing the nuts, as by split pins, so that the nuts are not completely tight. Similarly shaft 17 is attached via flange 18 to the wheel 10, and the wheel 10 to the flange 18, but nuts and bolts 20/20a are not tightened up. This is illustrated in FIG. 2, the nuts 20a and 21a are screwed on to the bolts 20 and 21 so as to leave a space between the nuts and the flanges 18 and 19, the nuts conveniently locked in this position by split pins 31. This enables the outboard wheel 11 to tilt relative to wheel 10.

Figure 4:
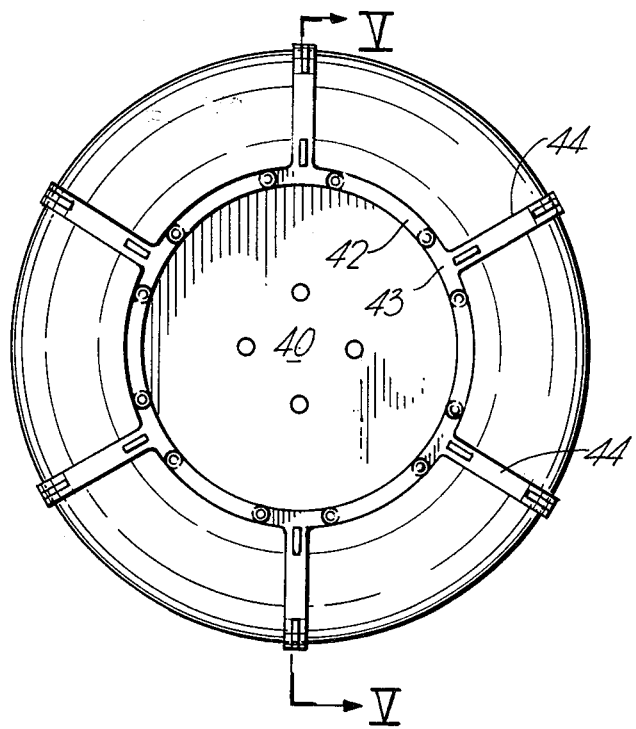
FIG. 4 is a side view of an alternative form of wheel member.
Figure 5:
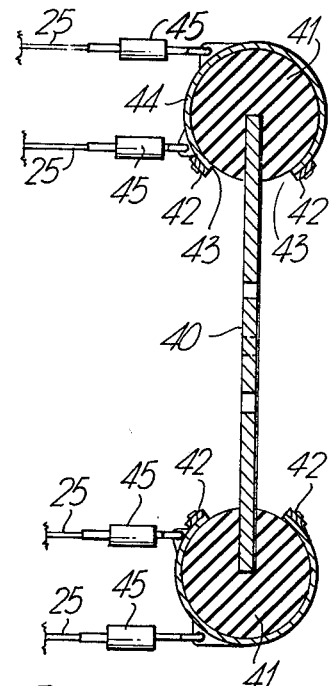
FIG. 5 is a cross-section on the line V—V of FIG. 4.

FIGS. 4 and 5 illustrate an alternative form of wheel member which comprises a metal disc-like member 40 having a moulded flexible rim 41. Circumferentially extending members extend around each wheel member and these members, in this example, are formed from a series of arcuate sections 42 connected by links 43. The radially extending members 44 are of concave curved sections attached to the links 43. The transverse cables 25 attach to the radially extending members 44. Other forms of wheel members, and other forms of circumferentially extending attachment members can be provided.

Thus, for example, in a form of wheel member as in FIGS. 4 and 5, attachment members for attachment of the transverse members 25 can be formed integrally with the rim, such as by moulding in members to which the ends of the members 25 can be attached. This avoids the need for the radially extending members 44, and the arcuate sections 42.

In operation, if a paddle 26 meets an obstacle, the cables 25 can flex. Such flexing is aided by the flexing of the tires 12 or flexible rims 41. If the outboard wheel hits an obstacle, such as floating ice, it can lift to some degree, while torque is still transmitted from the shaft 14 to shaft 17 via nuts and bolts 20/20a. The paddles 26 are driven by interengagement between the tires 12 or rims 41, and the circumferentially extending attachment members, that is chains 23 and 24 or members 42 and 44.

Flexibility between shaft 17 and shaft 14 can be provided by flexible attachment means such as bonded rubber mountings, instead of the nuts and bolts 20/20a.

Figure 6:
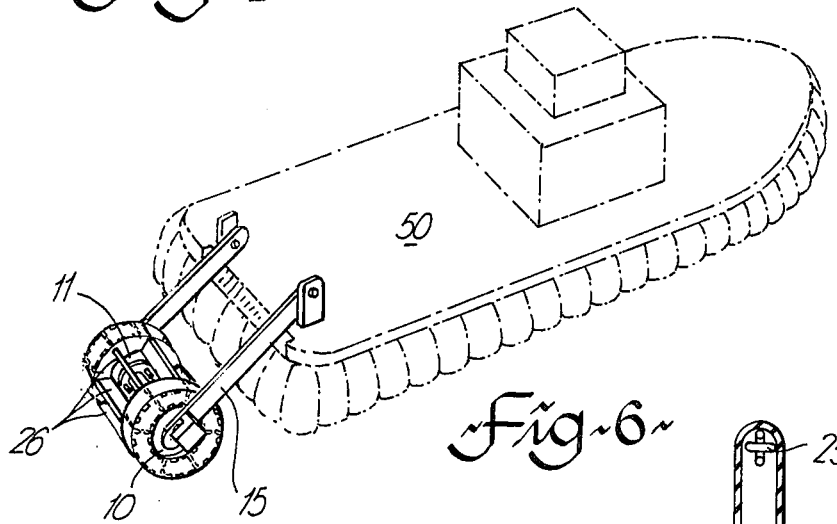
FIG. 6 illustrates an alternative arrangement of mounting a paddle-wheel assembly.

In the arrangement of FIGS. 1 and 2, mounting member 15 has been considered as a rigidly attached member of the vehicle. In FIG. 6, member 15 is pivotally attached to the structure of the vehicle, indicated at 50. In such an arrangement, the two wheels can be rigidly connected and can move up and down as an assembly by pivotting of the member 15. While the paddle wheel assembly is shown at the rear of a vehicle in FIG. 6, a paddle wheel assembly can be provided at other positions, for example one on each side of a vehicle, at the bow or even projecting through the bottom of a vehicle.

To provide a predetermined "stiffness" of the paddles, means can be provided for tensioning the cables 25. Thus, as indicated at 45 in FIG. 5, turnbuckles can be provided. Also the inflation pressure of tires can be varied to vary deflection of the tires.

The cables 25 can be moulded into the paddle structure as a unitary member instead of being in a tube and any tensioning devices can be between the ends of the cables and the attachment points at the radial members 24 or 44.

A vehicle with the present invention can be amphibious and on a hard surface the tires or rims can themselves provide propulsion.

A vehicle can be steered by propulsion means in accordance with the present invention. Thus, for example, two units as in FIGS. 1 and 2 can be provided with provision for relative speed variations. Alternatively, a unit can be pivotally mounted on a vehicle.

While the invention is applicable to the propulsion of vehicles supported, at least to some extend, by a fluid cushion, the invention is applicable to other forms of water borne vehicle and to amphibious vehicles.

A vehicle can be of many forms, being completely self contained or merely a barge or even a flat platform or raft, with a power supply to drive the wheel-like members.

What is claimed is:

1. A flexible paddle wheel structure, comprising:
   two axially spaced wheel-like members, each having a flexible rim;
   a plurality of pairs of radially spaced flexible transverse members extending between the rims and connected thereto, the pairs spaced around the axis of the wheel-like members;
   a separate and distinct flexible paddle member extending between the transverse members of each pair, to form a plurality of flexible radially extending paddles between the wheel-like members.

2. A structure as claimed in claim 1, including a plurality of radially extending attachment members on each rim, said radially spaced flexible transverse members attached at each end to said attachment members.

3. A structure as claimed in claim 2, including two circumferentially extending attachment members on each rim, one on each side of the rim, said radially extending attachment members attached at each end to said circumferentially extending attachment members.

4. A structure as claimed in claim 1, 2 or 3, said flexible paddle member comprising a tube of flexible material extending around the transverse members.

5. A structure as claimed in claim 1, including an axle and attachment means flexibly attaching a wheel-like member to each end of said axle, whereby a relative tilting movement can occur between each wheel-like member and the axle.

6. A structure as claimed in claim 5, including a further axle connected to one of said wheel-like members and means for rotating said further axle.

7. A vehicle including propulsion means as claimed in claim 5.

8. A vehicle at least partly supported by a cushion of pressurized fluid, and including a propulsion means as claimed in claim 5.

9. A structure as claimed in claim 1, including means for mounting said wheel-like members on a vehicle for propulsion thereof.

10. A structure as claimed in claim 9, said means for mounting the wheel-like members being movably attached to said vehicle, and means for raising and lowering the wheel-like members.

11. A vehicle including propulsion means as claimed in claim 1, 2 or 3.

12. A vehicle at least partly supported by a cushion of pressurized fluid, and including a propulsion means as claimed in claim 1, 2 or 3.

13. A structure as claimed in claim 1, said wheel-like members comprising wheels, said flexible rims comprising pneumatic tires.

14. A structure as claimed in claims 1, 2 or 3, including means for varying the tension in said flexible transverse members.

* * * * *